US006511693B2

(12) United States Patent
Jones

(10) Patent No.: US 6,511,693 B2
(45) Date of Patent: Jan. 28, 2003

(54) FROZEN SLUSHY IN A SQUEEZABLE POUCH

(75) Inventor: Robert C. Jones, Elk River, MN (US)

(73) Assignee: SoftPac Industries, Inc., Minneapolis, MN (US)

( * ) Notice: Subject to any disclaimer, the term of this patent is extended or adjusted under 35 U.S.C. 154(b) by 0 days.

(21) Appl. No.: 09/784,798

(22) Filed: Feb. 15, 2001

(65) Prior Publication Data

US 2001/0046545 A1 Nov. 29, 2001

Related U.S. Application Data

(60) Provisional application No. 60/182,487, filed on Feb. 15, 2000.

(51) Int. Cl.[7] .......................... A23L 1/0524; A23L 2/00; A23G 9/00; B65D 85/00
(52) U.S. Cl. .................. 426/565; 426/569; 426/599; 426/393; 426/399; 426/401; 426/115; 426/592
(58) Field of Search ..................... 426/60, 565, 569, 426/599, 393, 399, 401, 115, 592

(56) References Cited

U.S. PATENT DOCUMENTS

| 3,073,703 | A | | 1/1963 | Dunn | 99/192 |
|---|---|---|---|---|---|
| 3,619,205 | A | * | 11/1971 | LeVan et al. | 426/565 |
| 3,647,472 | A | * | 3/1972 | Speech et al. | 99/34 |
| 3,826,829 | A | * | 7/1974 | Marulich | 426/190 |
| 3,897,571 | A | | 7/1975 | Homler et al. | 426/327 |
| 3,922,371 | A | * | 11/1975 | Julien | 426/565 |
| 4,136,209 | A | | 1/1979 | Fox | 426/577 |
| 4,235,936 | A | * | 11/1980 | Kahn et al. | 426/330.3 |
| 4,264,637 | A | | 4/1981 | Braverman | 426/573 |
| 4,346,120 | A | | 8/1982 | Morley et al. | 426/565 |
| 4,452,823 | A | | 6/1984 | Connolly et al. | 426/115 |
| 4,704,293 | A | | 11/1987 | Moore et al. | 426/573 |
| 4,790,999 | A | * | 12/1988 | Ashmont et al. | 426/592 |
| 4,808,428 | A | * | 2/1989 | Forsstrom et al. | 426/569 |
| 4,816,283 | A | | 3/1989 | Wade et al. | 426/565 |
| 4,935,258 | A | | 6/1990 | Wade et al. | 426/565 |
| 5,493,866 | A | | 2/1996 | Hotaling | 62/66 |
| 5,698,247 | A | | 12/1997 | Hall | 426/66 |
| 5,853,785 | A | * | 12/1998 | Nayyar et al. | 426/565 |

OTHER PUBLICATIONS

PCT/US01/40124, International Search Report.

* cited by examiner

Primary Examiner—Nina Bhat
(74) Attorney, Agent, or Firm—Dorsey & Whitney LLP

(57) ABSTRACT

A frozen slushy drink product in a flexible pouch and a method for producing and packaging the same is provided. A calcium component, a stabilizer component, and a distinctively flavored component are combined and pasteurized at a temperature over about 180° F. The pasteurization causes the stabilizer component, in concert with the calcium component, to cause hydrophilic thickening. The product is packaged in a flexible pouch and is immediately consumable by a consumer after removal from a home freezer and manual manipulation of the pouch in order to break up the ice crystals and ensure a desirable slushy consistency.

31 Claims, 6 Drawing Sheets

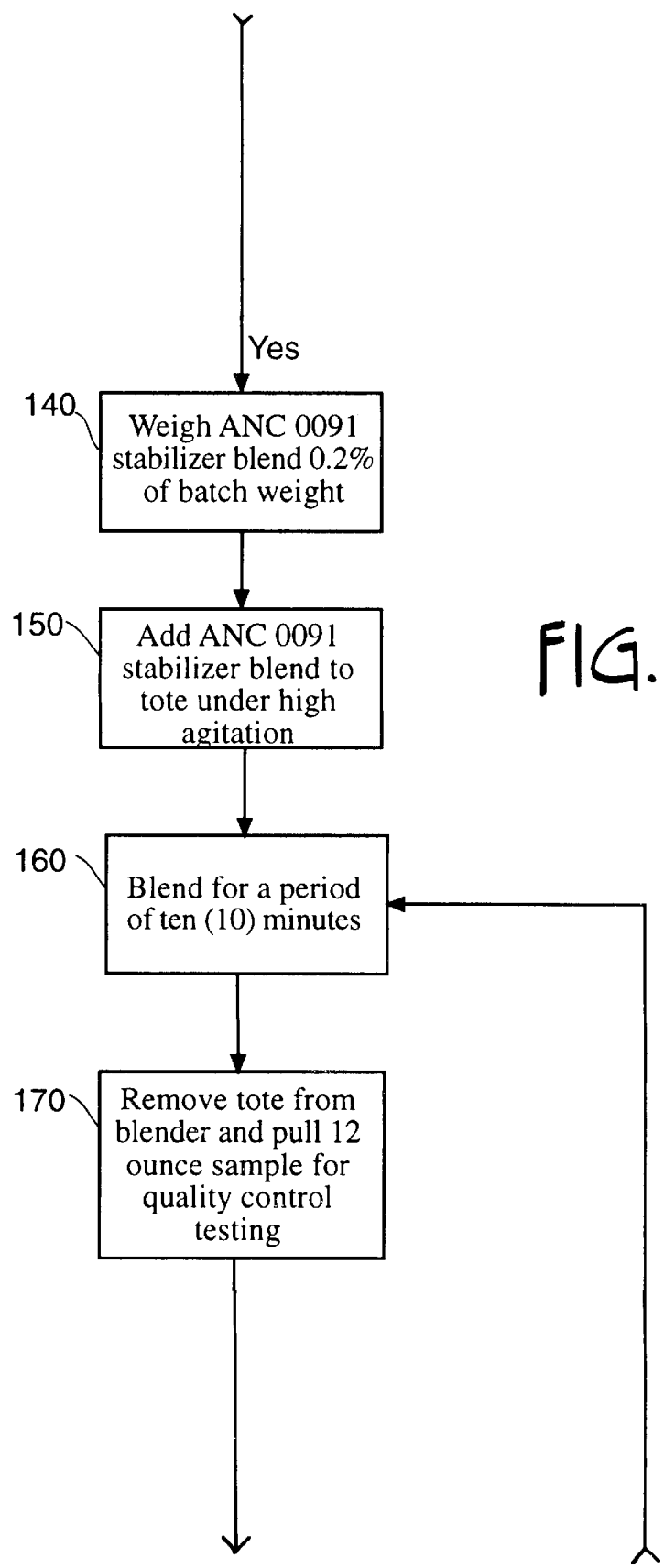

FROZEN SLUSHY IN A SQUEEZABLE POUCH

The present application claims priority of a U.S. provisional patent application, Serial No. 60/182,487, filed Feb. 15, 2000.

FIELD OF THE INVENTION

This invention pertains to a frozen drink product and method for packaging and producing same. More particularly, the present invention relates to a frozen drink product of a variety of flavors packaged in a squeezable pouch which a consumer may drink immediately after removal from a freezer.

BACKGROUND

During the last few decades, consumer eating patterns have changed dramatically. These changes are due in large part to the longer working hours experienced by many people and changes in family structures. Convenience has become a major factor in food purchase decisions. Consumers typically seek foods that not only taste good, but that require minimal preparation time, are conveniently packaged, and/or are portable.

Frozen slushy drink products are popular with children and adults alike. Children tend to favor frozen slushy drink products flavored with various flavors of juices or sodas, while frozen slushy drink products flavored with coffee or alcoholic beverages are increasingly popular with adults. These frozen slushy drink products are commonly prepared on a continuous basis with expensive machines used to constantly agitate the beverage during freezing. It is generally impractical to prepare such compositions in the home because of the specialized equipment required. While attempts to create these types of frozen slushy drink products pre-packaged for the home freezer have been made, generally the consistency, taste and overall product quality of these products does not measure up to similarly flavored slushy products made by specialized machinery.

Accordingly, there is a need for a convenient frozen slushy drink product which may be stored in the home freezer and that retains a desirable consistency and product quality when stored in the freezer. Such a product, which could be immediately consumed from the package after squeezing the package manually, would enable consumers to enjoy high quality slushy drink products in their own homes.

SUMMARY OF THE INVENTION

The present invention provides a frozen slushy drink product in a squeezable pouch immediately consumable by the consumer after removal from a home freezer and manual manipulation of the package in order to break up ice crystals in the product. This product may be of a variety of flavors, including but not limited to, fruit juice, coffee, cola, or a variety of flavors related to alcoholic beverages. The composition of the present invention has a number of ingredients, including a calcium component and a stabilizer component, that in combination cause a desirable thickening of the drink product upon pasteurization at a temperature of over about 180° F. The method of preparing the drink product causes relatively short ice crystals to form as the product freezes. Consequently, the frozen drink product is easily broken up upon manual manipulation of the squeezable pouch after removal of the product from the freezer. The squeezable pouch is portable and may be disposed of after consumption of the product.

The present invention offers many advantages over known frozen slushy drink products of a similar high quality. For example, the present invention is packaged and frozen in a portable squeezable pouch and does not require constant agitation while freezing. Also, the present invention attains a better slushy consistency than other frozen drink products that may be stored in a home freezer and immediately consumed. Further, children of all ages will enjoy the process of preparing the product for consumption by simply squeezing the pouch containing the product with their hands.

DETAILED DESCRIPTION OF THE INVENTION

Figure 1A:
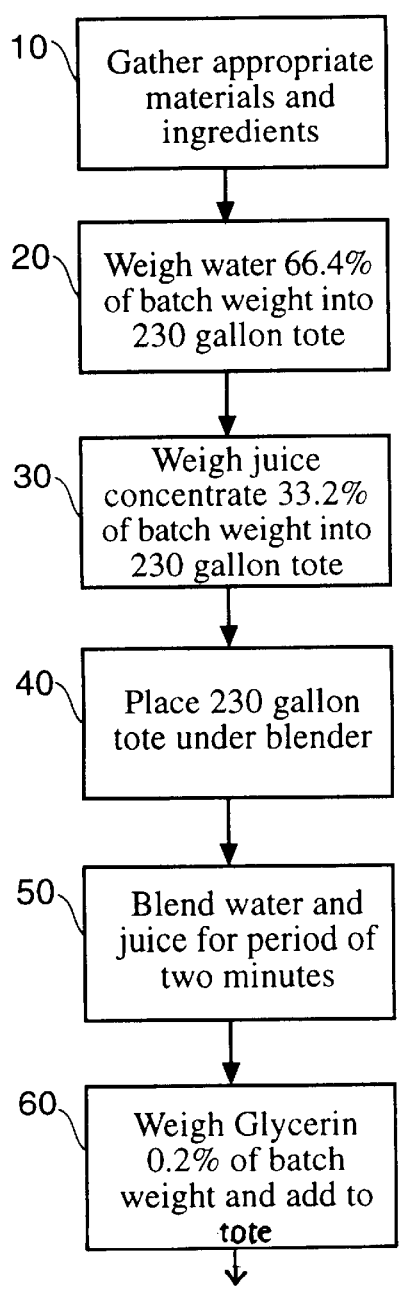
FIG. 1 is a flow chart of the method of producing the slushy drink product.
Figure 1A:
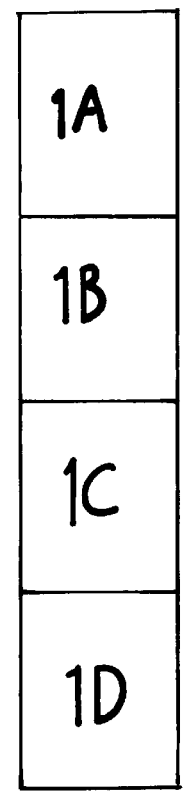
Figure 1B:
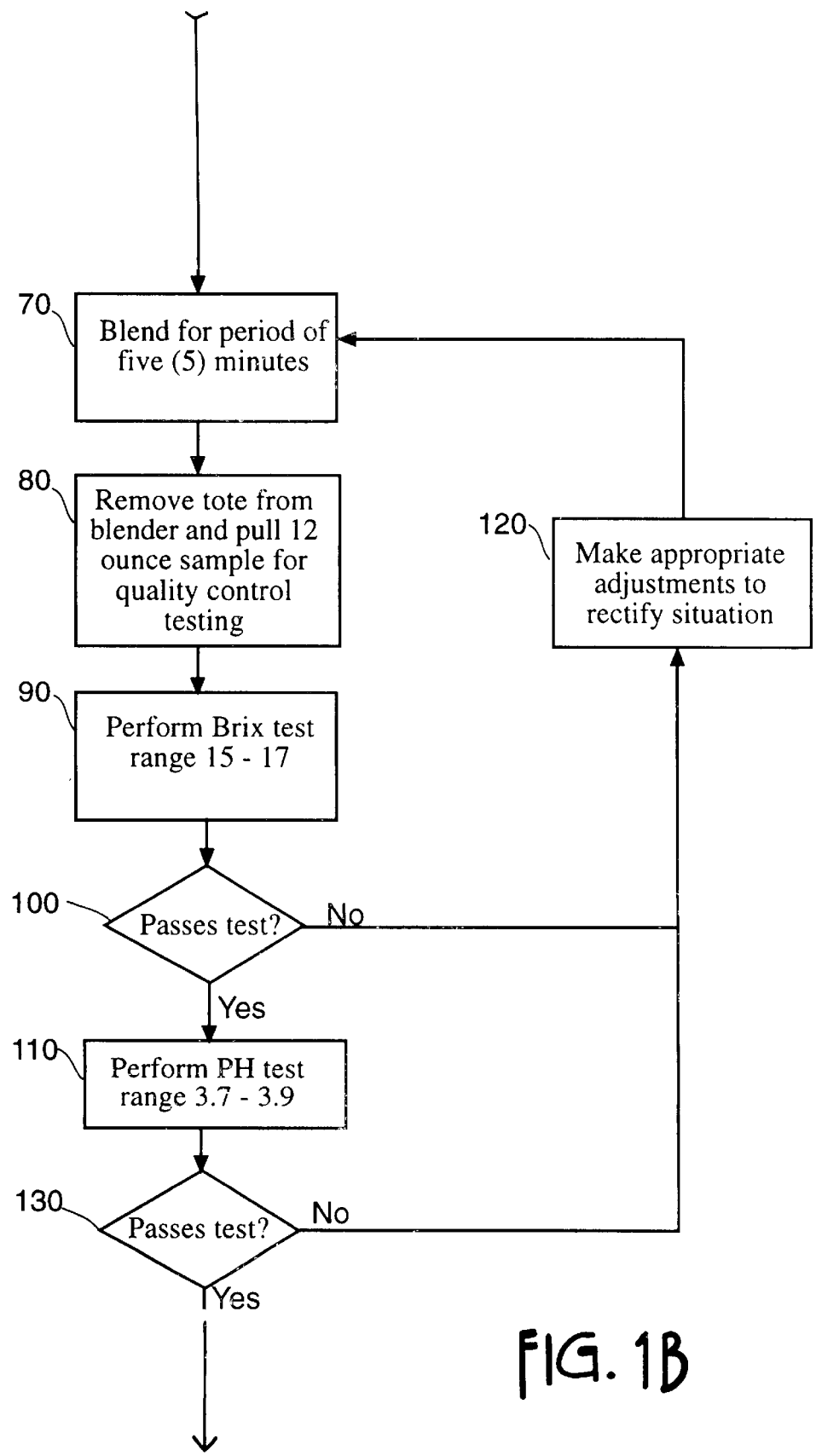
Figure 1D:
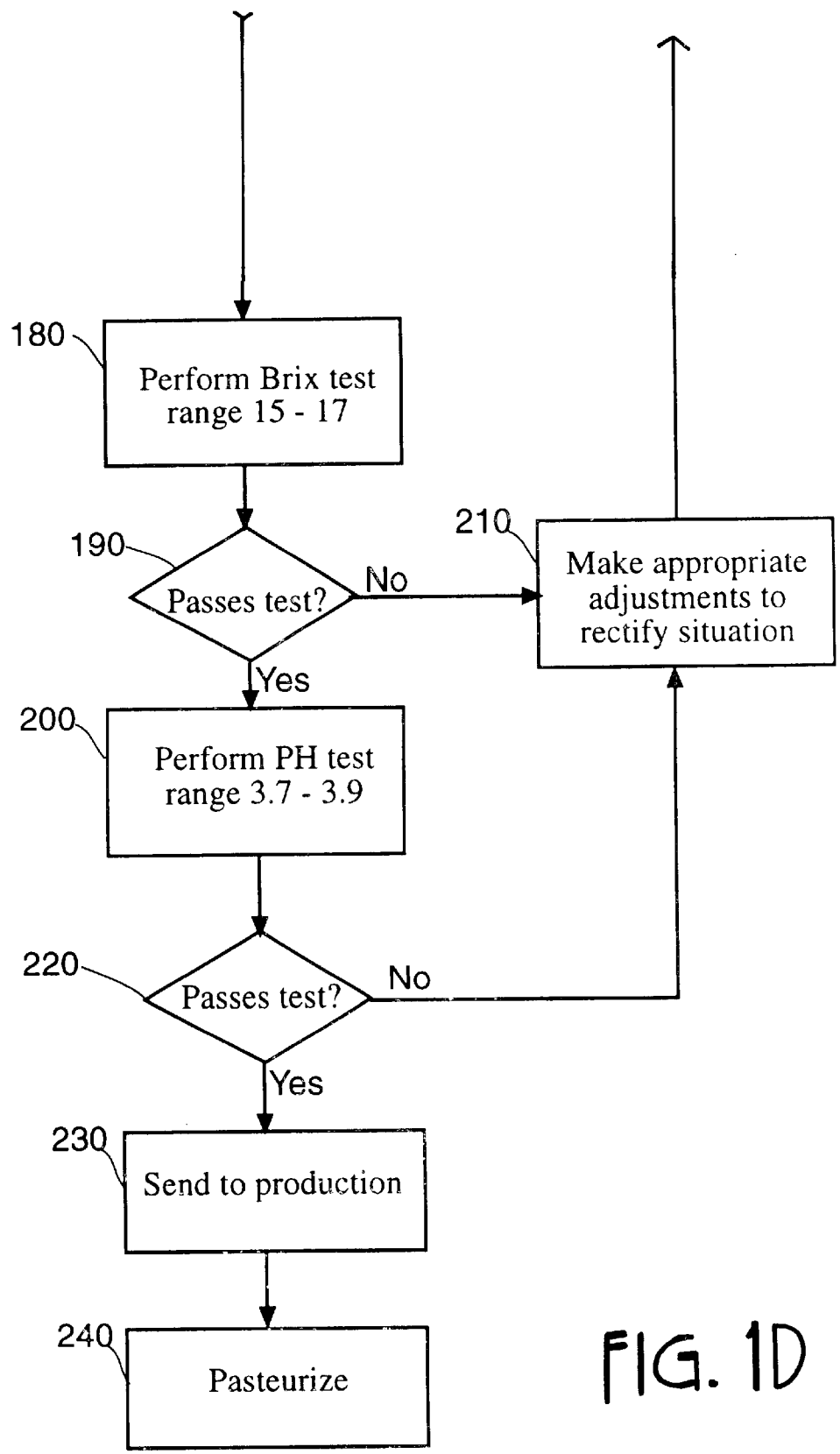

FIG. 1 depicts one embodiment of the method of producing the frozen slushy drink product. In the embodiment as depicted in FIG. 1, it is shown at 10 that in order to produce the frozen slushy drink product, the appropriate materials and ingredients must be gathered. This includes the various components that make up the drink product itself, as well as the machinery and containers used to prepare the drink product.

In the embodiment shown in FIG. 1, water is added to a large container at 20, such as a 230 Gallon Tote, in an amount equal to about 66.4 weight percent based on the total batch weight of the drink product. In FIG. 1, the distinctively flavored component of the flavored drink product is juice concentrate. In this embodiment, juice concentrate is added to the 230 Gallon Tote at 30 in an amount equal to about 33.2 weight percent based on the total batch weight of the drink product. Preferably, the sugar content of the juice concentrate is 50%. The 230 Gallon Tote is placed under a blender at 40 where the water and distinctively flavored juice component are blended for a period of about two minutes at 50. Glycerin is the added to the mixture in the 230 Gallon Tote at 60 in an amount equal to about 0.2 weight percent based on the total batch weight of the drink product. The glycerin acts as a natural anti-freeze to slightly lower the freezing temperature of the beverage and also acts as an antioxidant that serves as a type of product preservative. After the glycerin is added, the mixture may be blended for an additional period of about five minutes at 70 in order to ensure that a homogenous mixture is achieved.

The tote may then be removed from the blender and a sample of the drink product may be removed from the tote for quality control testing. FIG. 1 shows that a twelve ounce sample of the drink product may be removed from the tote for testing at 80. A brix test may be performed on the sample at 90 in order to determine the dissolved sugar content of the beverage. For a juice beverage, the dissolved sugar content of the drink product is preferably in the range of about 15 to about 17 percent dissolved sugars based on a reading from a refractometer. This range tends to give the overall product a desirable thickness so that a consumer may ultimately drink the product through a straw without the product seeming runny. This range also gives the overall product a desirable sweetness that is not overpowering. Most preferably, the dissolved sugar content of the drink product is 16.5% dissolved sugars. If not, at 120 appropriate adjustments may be made in order to ensure that the dissolved sugar content of the drink product falls within the appropriate range. As shown in FIG. 1, if adjustments are made to the drink product, the 230 Gallon Tote is returned to the blender at 70 for a period of about five minutes. Again, at 80 the tote is removed from the blender and a sample is pulled from the tote for quality control testing. The brix test is performed again at 90 to determine whether the dissolved sugar content of the drink product falls within the appropriate range or whether appropriate adjustments must again be made and additional blending be conducted.

If the sample of the drink product passes the brix test at 100, a pH test may be performed on the product sample at 110 to ensure that, when added, the pH sensitive stabilizer component may perform its function properly. For a drink product flavored with juice, the pH of the product preferably falls within a pH range of about 3.7 to about 3.9. The preferable pH range for the drink product may vary depending on the flavor of the beverage. If the pH of the product does not fall within a desirable range, appropriate adjustments, which are well known in the art, may be made to the drink product at 120 in order to rectify this problem. For example, if the pH of the drink product is too low, more buffer, such as baking soda, may be added to the tote in order to raise the pH of the product. Or, if the pH of the drink product is too high, an acid, such as a citric or malic acid, may be added to the tote in order to decrease the pH of the product. If adjustments are made to the drink product at 120, the product in the tote is again blended for a period of about five minutes at 70. After blending, a product sample is again pulled from the tote at 80 and a brix test is again performed at 90 since adjustments were made to the overall consistency of the product. After the product sample passes the brix test at 100 and then passes the pH test at 110, solids, such as a stabilizer blend may be added to the product.

FIG. 1 shows that at 140 a stabilizer blend, such as Advanced Nutritionals Corporation 0091 Stabilizer Blend, which includes Guar Gum, Xanthan Gum, LM Pectin low methoxy, and Dicalcium phosphate, may be weighed in an amount equal to about 0.2 weight percent based on the total batch weight of the drink product. Preferably, the components of the stabilizer blend are about 0.08 to about 0.12 weight percent Pectin, about 0.04 to about 0.08 weight percent Guar Gum, about 0.029 to about 0.049 weight percent Xanthan Gum, and about 0.0005 to about 0.002 weight percent Dicalcium Phosphate, based on the total batch weight of the drink product. The calcium component and stabilizer components may be added to the mixture as a blend or as individual components. At 150, the weighed stabilizer blend may be added to the 230 Gallon tote with an inline aspirator under high agitation. The mixture may then be blended under high agitation for a period of about ten minutes at 160. Dicalcium phosphate, the calcium component of the stabilizer blend, interacts with the stabilizer components of the stabilizer blend to enhance functioning of the stabilizer components.

The tote may then be removed from the blender and a sample of the drink product may be removed from the tote at 170 for another round of quality control testing. FIG. 1 shows that a twelve ounce sample of the drink product may be removed from the tote for testing. A brix test may be performed at 180 on the sample in order to determine the dissolved sugar content of the beverage. Preferably the dissolved sugar content of the drink product is in the range of about 15 to about 17 percent dissolved sugars based on a reading from a refractometer. If not, appropriate adjustments, which are well known in the art, may be made at 210 in order to ensure that the dissolved sugar content of the drink product falls within the appropriate range. As shown in FIG. 1, if adjustments are made to the drink product, the 230 Gallon Tote is returned to the blender at 160 for a period of about ten minutes. Again, the tote is removed from the blender at 170 and a sample is pulled from the tote for quality control testing. The brix test is performed again at 180 to determine whether the dissolved sugar content of the drink product falls within the appropriate range or whether appropriate adjustments must again be made and additional blending be conducted.

If the sample of the drink product passes the brix test at 190, a pH test may be performed on the product sample at 200 to ensure that the now present pH sensitive stabilizer component may perform its function properly. For a drink product flavored with juice, the pH of the product preferably falls within a pH range of about 3.7 to about 3.9. If the pH of the product does not fall within a desirable range, appropriate adjustments may be made to the drink product at 210 in order to rectify this problem. If adjustments are made to the drink product, the product in the tote is again blended at 160 for a period of about 10 minutes. After blending, a product sample is again pulled from the tote at 170 and a brix test is again performed at 180 since adjustments were made to the overall consistency of the product. After the product sample passes the brix test at 190 and then passes the pH test at 220, the product may be moved to production for packaging at 230.

After the frozen slushy drink product is sent to production for packaging, the drink product is pasteurized at 240 at a temperature of about 180° F. to about 190° F., preferably 185° F. The drink product is then packaged in a flexible container 242. Before the drink product is to be consumed, the drink product is stored in a freezer for a period of time long enough for the drink product to acquire a frozen slushy consistency. This may take at least about two hours.

When a consumer wishes to consume the frozen slushy drink product, the consumer may remove the product from a freezer and manually manipulate the flexible container 242 containing the drink product in order to break up the ice crystals that have formed in the container. This manual manipulation, or squeezing motion, ensures that the drink product is of a slushy consistency throughout with ice crystals small enough to fit through a relatively small opening 246 such as one that would accommodate a standard straw. After manipulation of the flexible pouch 242, the drink product may be immediately consumed by the consumer.

Figure 2:
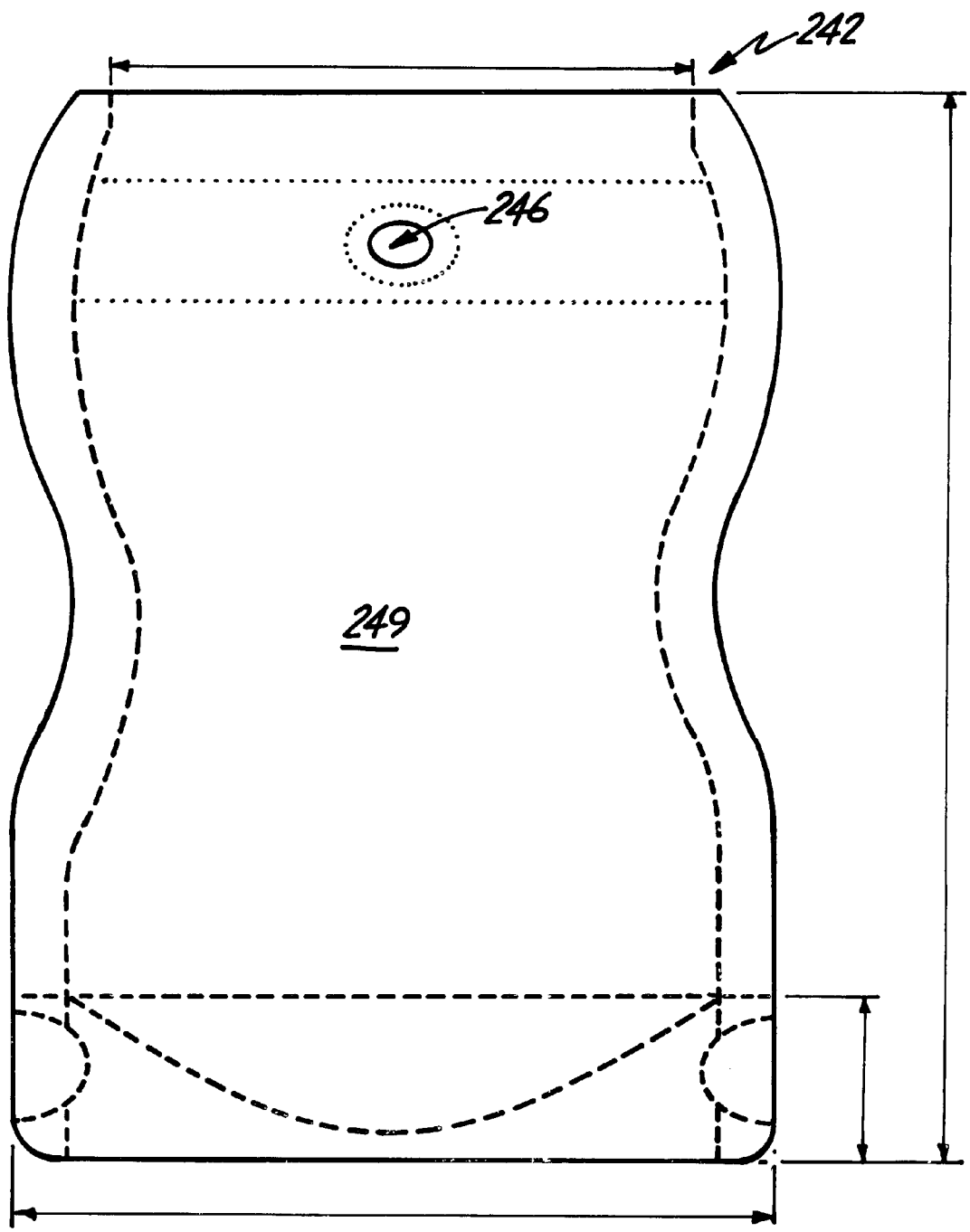
FIG. 2 is a front view of a flexible pouch that may be used to contain the slushy drink product when used in the process of packaging the drink product.
Figure 3:
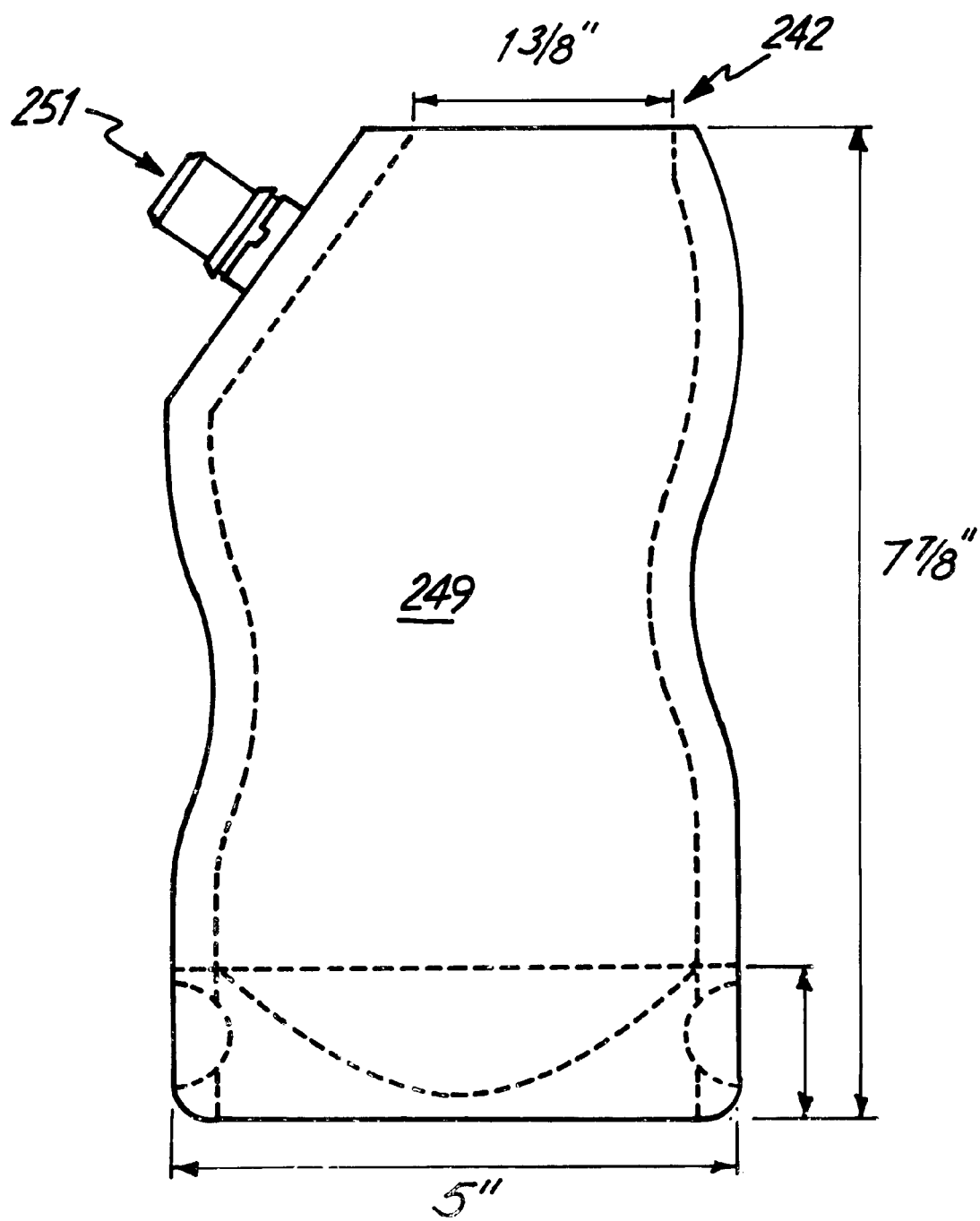
FIG. 3 is a side view of another flexible pouch that may be used to contain the slushy drink product and may be used to package the slushy drink product.

FIGS. 2 and 3 depict two embodiments of the flexible pouch 242 which may be used to contain the product of the present invention and used in the process of the present invention. These embodiments are made of a flexible material 249, such as polyfoil (a plastic and foil composite) or plastic, and have an opening 246, or an indication of a position in which an opening is to be easily made, where a consumer may extract drink product from the container 242. The depictions in FIGS. 2 and 3 are of embodiments of the flexible pouch 242 when empty and laid flat. FIG. 2 depicts a front view of one embodiment of the flexible pouch 242. This embodiment has a circle perforation 246 adapted for straw application. FIG. 3 depicts a side view of another embodiment of the flexible pouch 242. This embodiment has a screw top re-securable spout 251. Both of the embodiments depicted in FIGS. 2 and 3 have an indentation in the center of the package to enhance comfort while holding the pouch. These embodiments of the flexible pouch 242 are desirable because they provide a storage capacity large enough for a serving of frozen drink product, are flexible enough to allow manual manipulation of the package to break up the ice crystals formed in the product, and may be easily and comfortably held in a consumer's hand. However, flexible pouches 242 having other shapes, sizes, and capacities are within the scope of the present invention.

Those skilled in the art will recognize that the accompanying figures and this description depicted and described embodiments of the present invention, and features and components thereof. It is desired that the embodiments described herein be considered in all respects as illustrative, not restrictive, and that reference be made to the appended claims for determining the scope of the invention.

I claim:

1. A method for producing a frozen slushy drink product with relatively small, easily breakable ice crystals, the method comprising:
   providing at least one calcium component;
   providing at least one stabilizer component;
   providing at least one distinctively flavored component;
   combining the above components; and
   pasteurizing the combination of components.

2. The method of claim 1, wherein the combination of components is pasteurized at a temperature of over about 180° F.

3. The method of claim 2, wherein the at least one stabilizer component is pectin.

4. The method of claim 2, wherein the at least one distinctively flavored component is selected from the group consisting of fruit, soda, coffee, and alcohol.

5. The method of claim 2, wherein the pasteurized combination of components is packaged in a flexible pouch.

6. The method of claim 1, further comprising an antioxidant component.

7. The method of claim 6, wherein the antioxidant component is glycerin.

8. A frozen slushy drink product, comprising:
   at least one calcium component;
   at least one stabilizer component; and
   at least one distinctively flavored component, wherein each of the listed components are combined.

9. The frozen slushy drink product of claim 8, further comprising at least one antioxidant component.

10. The frozen slushy drink product of claim 9, wherein the at least one antioxidant component is glycerin.

11. The frozen slushy drink product of claim 8, wherein the at least one stabilizer component is pectin.

12. The frozen slushy drink product of claim 8, wherein the drink product is encased in a flexible pouch.

13. The frozen slushy drink product of claim 8, wherein the distinctively flavored component is selected from the group consisting of fruit, soda, coffee, and alcohol.

14. A method for packaging a frozen slushy drink product, which does not require constant agitation during freezing, the method comprising:
   providing a drink product comprising water and a distinctively flavored component;
   adding a stabilizer component and a calcium component;
   pasteurizing the resulting mixture, whereby the pasteurization causes the stabilizer component, in concert with the calcium component, to cause hydrophilic thickening;
   packaging the product in a flexible container comprising a flexible body;
   freezing the packaged product so that the combination of the components, the pasteurization and the hydrophilic thickening cause the drink product to form relatively small easily breakable ice crystals upon freezing which are immediately consumable by a consumer after removal from a home freezer and manual manipulation of the pouch in order to break up the ice crystals to produce the slushy consistency desired; and
   providing an opening for extracting the product from the container after the manual manipulation of the pouch causes the ice crystals to break up to produce the slushy drink product in the package.

15. The method for packaging a frozen slushy drink product of claim 14, wherein the flexible container is made of plastic.

16. The method for packaging a frozen slushy drink product of claim 14, wherein the flexible container is made of polyfoil.

17. The method for packaging a frozen slushy drink product of claim 14, wherein the drink product is pasteurized at a temperature of over about 180° F.

18. A frozen slushy drink product, comprising:
   about 60 to about 70 weight percent water;
   about 30 to about 35 weight percent juice concentrate;
   about 0.08 to about 0.12 weight percent pectin;
   about 0.04 to about 0.08 weight percent Guar Gum;
   about 0.029 to about 0.049 weight percent Xanthan Gum; and
   about 0.0005 to about 0.002 weight percent Dicalcium Phosphate, based on the total batch weight of the drink product.

19. The frozen slushy drink product of claim 18, wherein the frozen slushy drink product is packaged in a flexible container.

20. The frozen slushy drink product of claim 18, wherein the drink product is pasteurized.

21. The frozen slushy drink product of claim 20, wherein the dissolved sugar content of the drink product is below about 22 weight percent based on the total batch weight of the product.

22. The frozen slushy drink product of claim 21, wherein the dissolved sugar content of the drink product is between about 15 to about 17 weight percent based on the total batch weight of the product.

23. A frozen slushy drink product, comprising:
   about 60 to about 70 weight percent water, based on the batch weight of the total product;
   about 30 to about 35 weight percent juice concentrate, based on the batch weight of the total product;
   at least one stabilizer component; and
   at least one calcium component.

24. The frozen slushy drink product of claim 23, wherein the juice concentrate comprises from about 40 to about 50 weight percent sugar content.

25. The frozen slushy drink product of claim 23, wherein the drink product comprises less than about 22 weight percent dissolved sugar based on the total batch weight of the product.

26. The frozen slushy drink product of claim 23, wherein the drink product comprises from about 15 to about 17 weight percent dissolved sugar based on the total batch weight of the product.

27. A method of providing a slushy drink wherein one or more juices are combined with a stabilizer component, wherein the improvement comprises:
   adding sufficient calcium to cause hydrophilic thickening.

28. The method of claim 27 wherein the improvement further comprises:

pasteurizing the resulting mixture of components.

29. A process for making a frozen slushy drink comprising a mixture of water and a distinctively flavored component, wherein the process comprises:

performing a brix test on the mixture to ensure that the brix reading is from about 15 to about 17; and performing a pH test on the mixture to ensure that the pH of the mixture is from about 3.7 to about 3.9.

30. The process of claim 29, further comprising:

making adjustments to the mixture until the pH of the mixture is from about 3.7 to about 3.9 and the brix reading is from about 15 to about 17.

31. The process of claim 29, wherein the process further comprises;

adding a stabilizer component to the mixture.

\* \* \* \* \*

UNITED STATES PATENT AND TRADEMARK OFFICE
CERTIFICATE OF CORRECTION

| | | |
|---|---|---|
| PATENT NO. | : 6,511,693 B2 | Page 1 of 1 |
| APPLICATION NO. | : 09/784798 | |
| DATED | : January 28, 2003 | |
| INVENTOR(S) | : Robert C. Jones and Donald J. Trombley | |

It is certified that error appears in the above-identified patent and that said Letters Patent is hereby corrected as shown below:

Please insert item, [76] Robert C. Jones, Elk River, MN (US)
                             Donald J. Trombley, Elk River, MN (US)

Signed and Sealed this

First Day of August, 2006

JON W. DUDAS
*Director of the United States Patent and Trademark Office*